United States Patent [19]

Lostra

[11] Patent Number: 5,220,716
[45] Date of Patent: * Jun. 22, 1993

[54] TOOLS FOR DISASSEMBLING UNIVERSAL JOINTS

[76] Inventor: John M. Lostra, P.O. Box 841, Elko, Nev. 89801

[*] Notice: The portion of the term of this patent subsequent to Nov. 17, 2009 has been disclaimed.

[21] Appl. No.: 795,399

[22] Filed: Nov. 21, 1991

Related U.S. Application Data

[63] Continuation of Ser. No. 505,477, Jun. 17, 1983.

[51] Int. Cl.$^5$ .............................................. B25B 27/02
[52] U.S. Cl. ...................................... 29/252; 403/375; 403/381; 29/258
[58] Field of Search ......................... 29/252, 256–262, 29/264, 265, 283; 403/371, 375, 385

[56] References Cited

U.S. PATENT DOCUMENTS

| | | | |
|---|---|---|---|
| 1,468,786 | 9/1923 | Knechtel | 403/381 |
| 1,498,933 | 6/1924 | Seppmann | 29/239 |
| 2,507,003 | 5/1950 | Gagne | 29/283 |
| 2,566,847 | 9/1951 | Miller | 29/252 |
| 2,706,849 | 4/1955 | Miller | 29/252 |
| 2,807,081 | 9/1957 | Black | 29/252 |
| 2,950,525 | 8/1960 | Duncan et al. | 29/252 |
| 2,978,167 | 4/1961 | Harp | 29/252 X |
| 3,008,226 | 11/1961 | Kellerman | 29/201 |
| 3,069,761 | 12/1962 | Sommer | 29/252 |
| 3,076,259 | 2/1963 | Stebbins | 29/259 |
| 3,217,394 | 11/1965 | Castoe | 29/252 |
| 3,230,617 | 1/1966 | Spiess et al. | 29/434 |
| 3,337,943 | 8/1967 | Powell | 29/252 |
| 3,339,263 | 9/1967 | Dodge | 29/252 |
| 3,846,891 | 11/1974 | Elg | 29/261 |
| 3,908,258 | 9/1975 | Barty | 29/252 |
| 3,927,462 | 12/1975 | Freeman et al. | 29/427 |
| 4,019,233 | 4/1977 | Jirele | 29/261 |
| 4,129,931 | 12/1977 | Carrigan | 29/252 |
| 4,182,011 | 1/1980 | Bretzger et al. | 29/148.4 A |
| 4,194,847 | 3/1980 | Grey | 403/375 |
| 4,240,191 | 12/1980 | Schroyer | 20/426.5 |
| 4,437,220 | 3/1984 | Gregory | 29/256 X |
| 4,544,300 | 10/1985 | Lew et al. | 403/381 |

FOREIGN PATENT DOCUMENTS

| | | |
|---|---|---|
| 1215526 | 12/1986 | Canada . |
| 966270 | 10/1950 | France . |
| 2113139 | 8/1983 | United Kingdom . |
| 82/04415 | 12/1982 | World Int. Prop. O. . |

*Primary Examiner*—J. J. Swann
*Attorney, Agent, or Firm*—Joseph G. Seeber

[57] ABSTRACT

Tools for the disassembly of a universal joint comprise two embodiments, a pull-type tool and a push-type tool. In the pull-type tool, a pulling force is exerted on a yoke member other than the yoke member from which a journal bearing is to be removed, an opposite pushing force is exerted on that end or collar portion of the yoke member containing the journal bearing to be removed, and a cylinder/piston combination interposed between the pulling assembly and the pushing assembly operates to cause the exertion of the pulling and pushing forces, so that the journal bearing is forced out of the collar portion adjacent to the pushing assembly. With respect to the push-type tool, a cylinder/piston combination is mounted on a pushing or support assembly, and the cylinder/piston combination is operated to force the piston downward so as to exert a pushing force via the pushing assembly on the universal joint cross, thus forcing the far side journal bearing out of its yoke member. In each embodiment, the cylinder is provided with two apertures which accommodate the nozzle of a conventional grease gun, so that grease under high pressure can be injected into the cylinder so as to motivate the piston to apply the pulling or pushing force, depending on which embodiment is utilized. Other inventive features are disclosed.

3 Claims, 3 Drawing Sheets

TOOLS FOR DISASSEMBLING UNIVERSAL JOINTS

This application is a continuation of application Ser. No. 06/505,477, filed Jun. 17, 1983.

BACKGROUND OF THE INVENTION

1. Field of the Invention

The present invention relates to tools for disassembling universal joints, and more specifically to two different types of tools—a pull-type tool and a push-type tool —for disassembling universal joints of vehicles.

2. Description of Prior Art

There are various situations in which it is necessary to disassemble the universal joint of the drive shaft of a vehicle. For example, prior to towing a vehicle with the drive wheels remaining on the ground, it is necessary to disconnect the transmission from the drive axles to protect the vehicle from damage during towing. This is generally achieved by disconnecting the drive shaft universal joint at the drive axle pinion yoke, or occasionally by pulling the drive axle shafts. However, substantial problems are often encountered when disassembling the universal joint.

Specifically, although new universal joint components are shiny and have accurately machined fits, and can be assembled easily, even when in dry condition, once a vehicle has been used for a year or more without disassembling the drive shaft universal joint, the universal joint soon becomes rusted due to wet roads and/or salty roads, so that the universal joint components become so tightly assembled that it is virtually impossible to disassemble them.

Faced with such a problem, mechanics and towing/wrecker crews often resort to hammering the universal joint components apart, but that is very destructive to the components. In addition, even that technique is often not effective or is difficult to carry out, especially when it has to be done at night on cold, wet roads with merely a flashlight as a light source. The problems are further compounded by the fact that, in towing situations, there is usually very little room in which to work.

In response to the above-discussed problems, a mechanical puller apparatus for disassembling universal joints has been developed, and is disclosed in U.S. Pat. No. 4,019,233—Jirele. The apparatus or tool disclosed in that patent employs a driver screw which is rotated mechanically or manually to exert a downward force on a bridge assembly connected to a first yoke member of the universal joint, while an upward pulling force is exerted on bosses connected to the second yoke member of the universal joint by means of puller arms which are threadably connected to the driver screw.

Small hand pullers of the type described in the aforementioned patent have significant drawbacks. Notably, since such pullers are operated by manual force, their effectiveness varies from user to user, and often they are ineffective to do the job. In addition, such small hand pullers are not effective for the purposes of towing and wrecker crews, in that working conditions on the road (poor lighting, inclement weather, insufficient working space, and so forth) render manual pullers even less effective.

A further disadvantage of the manual puller described in the aforementioned patent resides in the fact that, in the use of such a "rotating screw" tool, many unwanted reaction forces are produced when the screw is rotated manually, and this interferes with the successful accomplishment of the universal joint disassembly operation. This problem, together with the aforementioned problems of poor working conditions, results in the consumption of excessive time as the user attempts to disassemble the universal joint. Finally, it will be recognized that puller-type tools such as disclosed in the aforementioned patent are bulky, and this is a disadvantage not only from the standpoint of using the tool, but also from the standpoint of transporting the tool to the worksite.

Large, industrial-type tools are available in the marketplace, and are used for pulling assembled components apart, or pushing components out of an assembly. Such large, industrial-type tools often employ electric motors or pneumatic-powered hydraulic power packs, and occasionally hand-powered units are employed in conjunction with closed hydraulic circuits. The following U.S. patents disclose such types of hydraulic-powered apparatus or arrangements: U.S. Pat. No. 2,807,081 —Black; U.S. Pat. No. 3,069,761—Sommer; and U.S. Pat. No. 3,908,258—Barty.

However, such powered apparatus or arrangements are burdened by several disadvantages. They are usually very large and bulky, and are therefore not suitable for transport to and from towing or wrecker worksites, and are also not suitable for use under the adverse conditions often encountered by towing and wrecker crews. In addition, such industrial-type powered apparatus often operate under hydraulic power, and accordingly require auxiliary hydraulic sources to power their operation, thus increasing their bulkiness and non-portablity. Finally, such apparatus or arrangements as disclosed in the latter three patents are simply not suitable or adaptable for use in the specific application of disassembling universal joints.

Other disassembly or pushing/pulling tools or apparatus, even less applicable to the job of disassembling drive shaft universal joints, are disclosed in the following U.S. Pat. Nos. 2,950,525—Duncan et al; 3,337,943—Powell; 3,339,263—Dodge; 1,498,933—Seppmann; 2,507,003—Gagne; 2,566,847—Miller; 3,230,617—Spiess et al; 3,927,462—Freeman et al; and 4,182,011—Bretzger et al.

To summarize, the state of the prior art in this area of technology is such that it would be considered highly desirable and advantageous to have a tool or apparatus which is specifically designed for the disassembly of drive shaft universal joints, especially under adverse road conditions as usually encountered by towing and wrecker crews. Such drive shaft universal joint disassembly tools should have the following characteristics: they should be portable and easily transportable to the worksite; they should be powered so as to facilitate their use, especially under conditions of limited space and adverse working conditions; and they should be powered by some power source normally available to towing and wrecker crews at the worksite.

SUMMARY OF INVENTION

The present invention relates to tools for disassembly of a drive shaft universal joint, and more specifically to pull-type and push-type tools for disassembly of a universal joint of a drive shaft.

In one embodiment, a pull-type tool is utilized to disassemble a universal joint by forcing one of two journal bearings mounted in respective end portions of a first yoke member out of the first yoke member. The pull-type tool comprises a pulling arrangement connectable to the second yoke member of the universal joint for exerting a pulling force thereon, a standoff arrangement (comprising standoff studs) connectable to a given end portion of the first yoke member for exerting a pushing force (opposite to the pulling force) thereon, and an operating mechanism (in the form of a piston-cylinder combination) interposed between the pulling assembly and the standoff arrangement for operating on the pulling assembly to cause it to exert the pulling force, and for operating on the standoff arrangement to cause exertion of the pushing force, so that the journal bearing mounted in the given end portion of the first yoke member is forced out of that portion. In accordance with a further feature of the invention, the piston of the operating arrangement is movable within the cylinder thereof in response to the injection of fluid under high pressure (such as grease from a high-pressure grease gun) into the cylinder so as to urge the pulling assembly in a direction away from the universal joint while the standoff arrangement maintains a pushing force in a direction toward the universal joint.

Preferably, the first embodiment has a headplate and sidebars which form the pulling assembly while standoff studs form the standoff arrangement, the standoff studs having threaded ends which are insertable in corresponding threaded holes located in an end portion of the yoke member from which the journal bearings are to be removed.

As a further preference, the operating arrangement includes an aperture located in the wall of the cylinder for receiving the nozzle of a grease gun, from which grease at high pressure is injected into the cylinder so as to provide moving force to the piston contained therein.

A second embodiment of the invention comprises a push-type tool for disassembling a universal joint, the push-type tool comprising a cylinder closed at one end remote from the yoke member from which the journal bearing is to be removed, a piston movable within the cylinder along its axis, and an injection mechanism located at a point in the cylinder wall between the closed end and the piston for receiving and injecting fluid under high pressure into the cylinder so as to move the piston toward the journal bearing, forcing the bearing out of the far end of the yoke member.

Preferably, the push-type tool includes a support arrangement having a flat surface on which the cylinder is positioned, and contact fingers extending from the flat surface toward the universal joint so as to contact a first yoke member, which is perpendicular to a second yoke member from which the journal bearing is to be removed, at respective points on either side of the first yoke member.

As a further preference, boreholes are provided within the cylinder wall and parallel to the cylindrical axis, and the yoke member from which the journal bearing is to be removed has threaded holes provided in its near end (that is, the end closest to the tool) along an axis parallel to the cylindrical axis and in alignment with the boreholes so that threaded cap screws can be inserted through the boreholes and can be screwed into the threaded holes, thus securing the tool to the universal joint for the disassembly operation.

Furthermore, the push-type tool is preferably provided with injection means in the form of an aperture running through the wall of the cylinder at a point between the closed end thereof and the piston for receiving the nozzle of a grease gun, from which grease is injected under high pressure to move the piston and force the journal bearing from the remote end of the yoke member (that is, the end of the yoke member furthest, from the tool).

Advantages of the present invention are as follows. Both embodiments of the invention comprise a compact tool, highly portable in nature, for disassembling the universal joint of the drive shaft of a vehicle .utilizing a technique involving the injection of high-pressure fluid, such as grease from a grease gun, into a cylinder so as to drive a piston to create either a pulling force (via the use of a headplate and sidebars) or a pushing force (via the use of a support assembly) for ejecting a journal bearing from an end portion of a yoke member of the universal joint. Thus, the present invention provides two embodiments of a universal joint disassembly tool, both of which embodiments have the advantage of portability usually associated with manually driven tools, as well as the further advantage of high-pressure operation usually associated with large industrial-type pulling or pushing apparatus.

Furthermore, it should be noted that the two embodiments of the universal joint disassembly tool have several elements or components in common (such as the piston and cylinder), so that a relatively small and highly portable tool kit can be devised while providing the user with the advantages of both embodiments (both the pull-type and push-type tools).

Therefore, it is a primary object of the present invention to provide tools for the disassembly of a drive shaft universal joint of a vehicle.

It is an additional object of the present invention to provide tools for the disassembly of a universal joint, wherein the tools operate in response to the injection of fluid under high pressure into the tool.

It is an additional object of the present invention to provide tools for the disassembly of a universal joint, wherein the tools are composed of a compact arrangement of elements resulting in a high degree of portability.

It is an additional object of the present invention to provide tools for the disassembly of a universal joint, wherein the tools comprise pull-type tools which exert a pulling force on the universal joint, while exerting a pushing force on an end portion of that one of the yoke members of the universal joint from which a journal bearing is to be removed.

It is an additional object of the present invention to provide tools for the disassembly of a universal joint, wherein the tools comprise push-type tools which apply a pushing force on the journal bearing to be removed from the universal joint.

The above and other objects that will hereinafter appear, and the nature of the invention, will be more clearly understood by reference to the following description, the appended claims, and the accompanying drawings.

DETAILED DESCRIPTION

The present invention will now be more fully described with reference to the various figures of the drawings.

Figure 1:
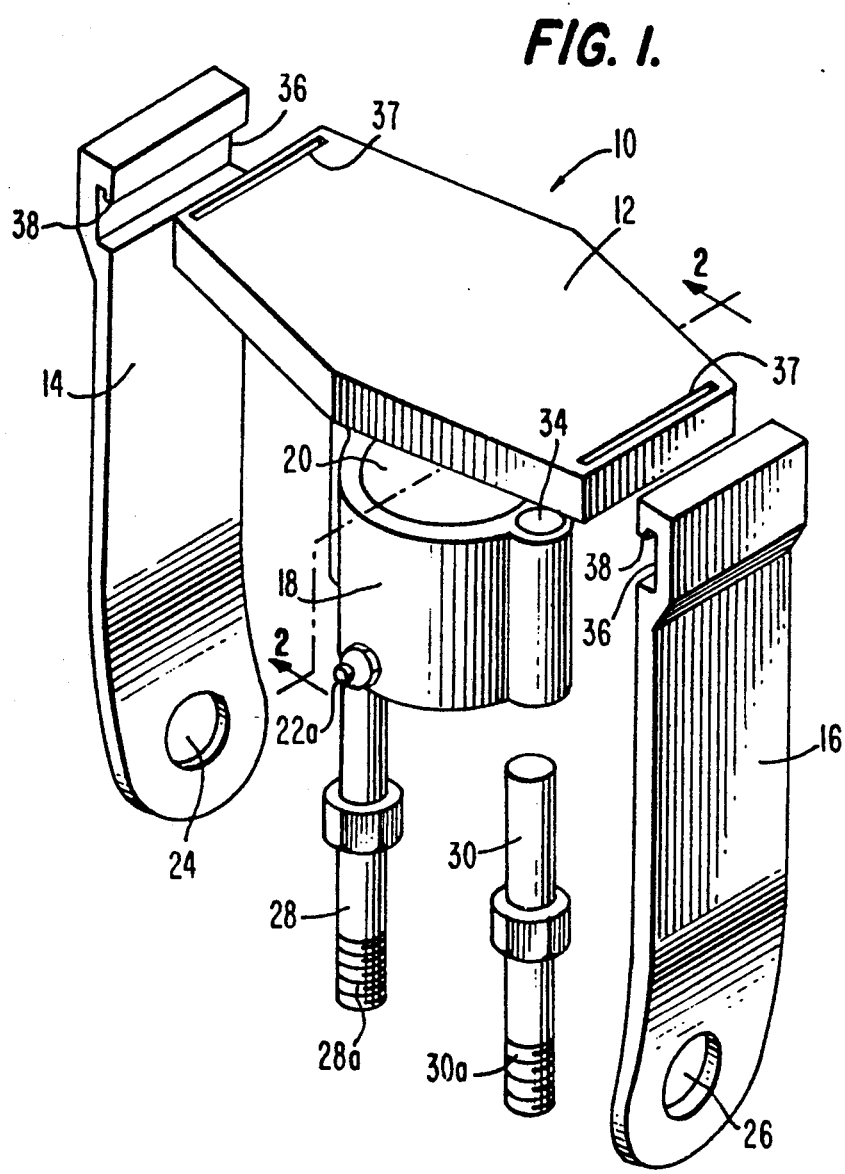
FIG. 1 is a perspective view of a first embodiment of the present invention, comprising a pull-type tool.

FIG. 1 is a perspective view of a first embodiment of the invention, comprising a pull-type tool for disassembly of a universal joint. As seen therein, the pull-type tool comprises a headplate 12, sidebars 14 and 16, a cylinder 18, a piston 20, a filler plug 22a, and standoff studs 28 and 30. As also seen in FIG. 1, sidebars 14 and 16 are provided with grooves 36 at the top portions thereof, the grooves 36 functioning to accommodate end portions of the headplate 12, while the end portions of the headplate 12 are provided with slots 37, into which downwardly protruding portions 38 of the end portions of the sidebars 14 and 16 are inserted when assembling the tool 10.

Sidebars 14 and 16 are further provided, at their distal ends, with holes 24 and 26, the latter being designed to accommodate cap screws (to be discussed below) on the universal joint. In addition, standoff studs 28 and 30 are dimensioned so as to be insertable into boreholes 34 provided in opposing portions of the cylindrical wall of the cylinder 18, while the standoff studs 28 and 30 are provided at their other ends with threaded portions 28a and 30a, respectively, the latter being provided so that the standoff studs 28 and 30 can be screwed into respective boreholes (to be discussed below) in an end portion of the yoke member, from which the journal bearing is to be removed, in the universal joint.

Figure 2:
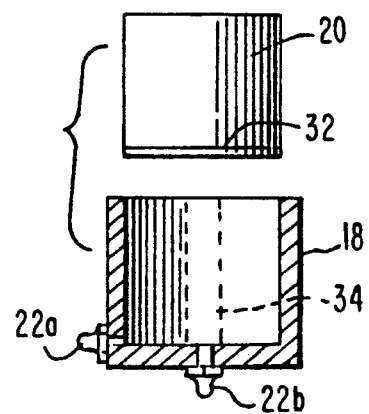
FIG. 2 is a cross-sectional view of the cylinder of the present invention, as seen along line A—A' in FIG. 1.

FIG. 2 is a cross-sectional view of the cylinder 18 of FIG. 1, taken along the section line A—A' thereof. As seen in FIG. 2, the inner dimensions of the cylinder 18 are such as to accommodate a piston 20. An O-ring grease seal grease fitting 32 is positioned on the piston 20 prior to inserting the piston 20 into the cylinder 18. Cylinder 18 is also provided with filler plugs 22a and 22b. As seen in FIG. 2, opposing portions of the cylindrical wall of the cylinder 18 are provided with boreholes 34, into which standoff studs 28 and 30 can be inserted.

Figure 3:
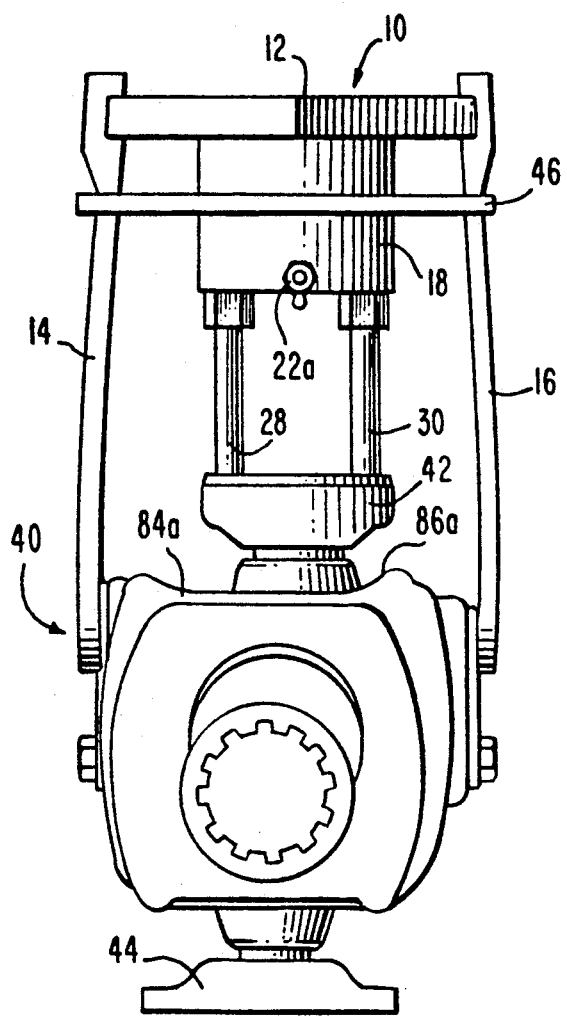
FIG. 3 is a front view of the first embodiment of the present invention, as utilized during a first step of disassembling a universal joint.

FIG. 3 is a front view of the pull-type tool 10 of FIG. 1, as assembled for operation in the disassembly of the universal joint. As seen in FIG. 3, the universal joint 40 comprises a pair of yoke members generally perpendicular to each other, with the end portions of a first yoke member being indicated by reference numerals 42 and 44. As is well-known to those of skill in the art, such universal joints contain journal bearings (not shown), each journal bearing being disposed adjacent to or in a respective end portion (such as end portions 42 and 44) of the universal joint. The operation of disassembling a universal joint, using the pull-type tool 10' will now be described with reference to FIG. 3.

As a first step in such a disassembly operation, the pull-type tool 10 is utilized to remove the journal bearing (not shown) contained in end portion 42 of the vertical yoke of universal joint 40. The two standoff studs 28 and 30 are screwed into boreholes in the end portion 42 of the yoke, and the cylinder 18 is slipped over the upper portions of the standoff studs 28 and 30 by inserting those upper portions into the boreholes 34 contained in the cylinder wall of cylinder 18.

Figure 4:
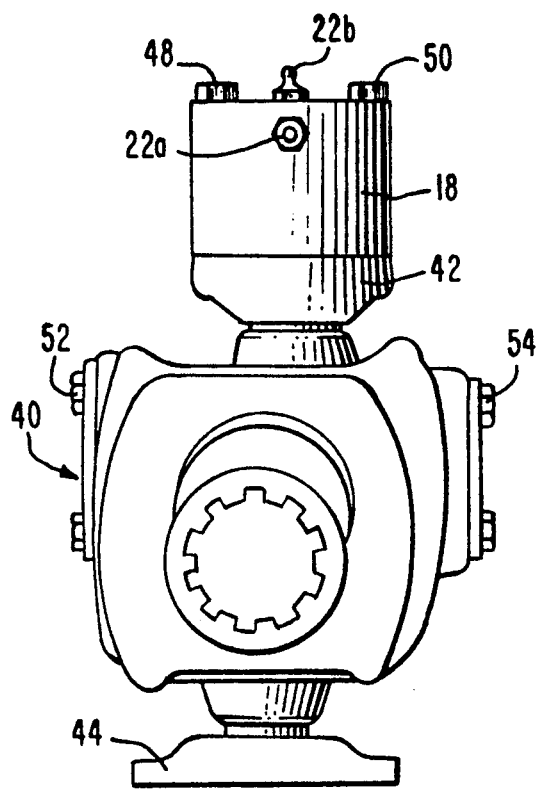
FIG. 4 is a front view of the first embodiment of the present invention, as utilized during a second step of disassembling a universal joint.
Figure 5:
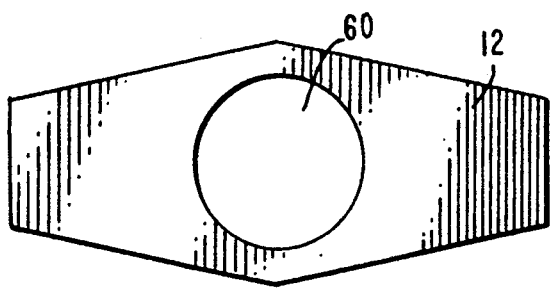
FIG. 5 is a bottom view of the headplate shown in FIG. 3.

With reference to FIG. 5, which is a bottom view of the headplate 12, it is seen that headplate 12 contains a recessed portion or shallow bore 60 in its bottom face, so that the headplate 12 can be placed on top of the cylinder 18, it being noted that the cylinder 18 is positioned with its open end facing upward. A pull yoke assembly is now formed by placing sidebars 14 and 16 in engagement with the left and right end portions of the horizontal yoke of universal joint 40, as shown in FIG. 3. This is accomplished by slipping sidebars 14 and 16, and specifically the holes 24 and 26 (FIG. 1) therein, over retaining cap screws 52 and 54, which are best seen in FIG. 4. The upper portions of sidebars 14 and 16 are then engaged with the end portions of headplate 12, as previously discussed above with reference to the grooves, 36, slots 37 and downwardly protruding portions 38 of sidebars 14 and 16, as best seen in FIG. 1. Finally, the entire assembly is held together for convenience in handling with an appropriately sized O-ring 46.

The nozzle of a conventional grease gun is placed on filler plug 22a or 22b so that grease pressure can be applied to the interior of the cylinder 18. This pressure causes the piston 20 to rise inside of cylinder 18, exerting a lifting force on the headplate 12, and thus on the sidebars 14 and 16, as well as the horizontal yoke attached thereto. This, in turn, causes a lifting force to be applied to the journal bearing contained within the upper yoke collar 42.

In the meantime, standoff studs 28 and 30, disposed between the cylinder 18 and the upper yoke collar 42, exert a downward force on the upper yoke collar 42. As a result, the journal bearing contained in the upper yoke collar 42 slips out into the space beneath the cylinder 18 and between the standoff studs 28 and 30. Headplate 12, sidebars 14 and 16, cylinder 18 and studs 28 and 30 can be removed, and the bearing is picked off. At this point, the journal end of the universal joint cross in the vertical yoke of FIG. 3 is exposed.

FIG. 4 is a front view of the pull-type tool, as utilized in a second step in the disassembly process, that is, the step of removing the journal bearing (not shown) contained in the lower yoke collar 44 of universal joint 40. After the first step is completed, power cylinder 18 is emptied by taking out filler plug 22a or 22b (FIG. 2) and pushing the piston 20 back in the bore of cylinder 18. The filler plug 22a or 22b and piston 20 are then reinstalled, and cylinder 18 is then placed, with its open end downward, on the upper yoke collar 42, and is fastened thereto using cap screws 48 and 50. At this point, the piston 20 is contacting the exposed journal end of the universal joint cross.

The nozzle of a conventional grease gun is inserted into filler plug 22a or 22b and grease pressure is once again applied to the interior of cylinder 18, causing piston 20 to move downward, forcing the journal bearing in lower yoke collar 44 to be pushed out of its bore. At this point, with both bearings removed, the universal joint cross, which is attached to the other yoke (the horizontal yoke in the figures), and that end of the drive shaft, can now be taken off the drive pinion yoke.

For total disassembly of the universal joint with the present invention, two conventional hook adapters of appropriate fit can be placed over the bare ends of the universal joint cross, the latter being well-known to those of skill in the art, and the arrangements of FIGS. 3 and 4 can be again employed in a two-step process to remove journal bearings from the end portions of the other yoke (the horizontal yoke).

Figure 6:
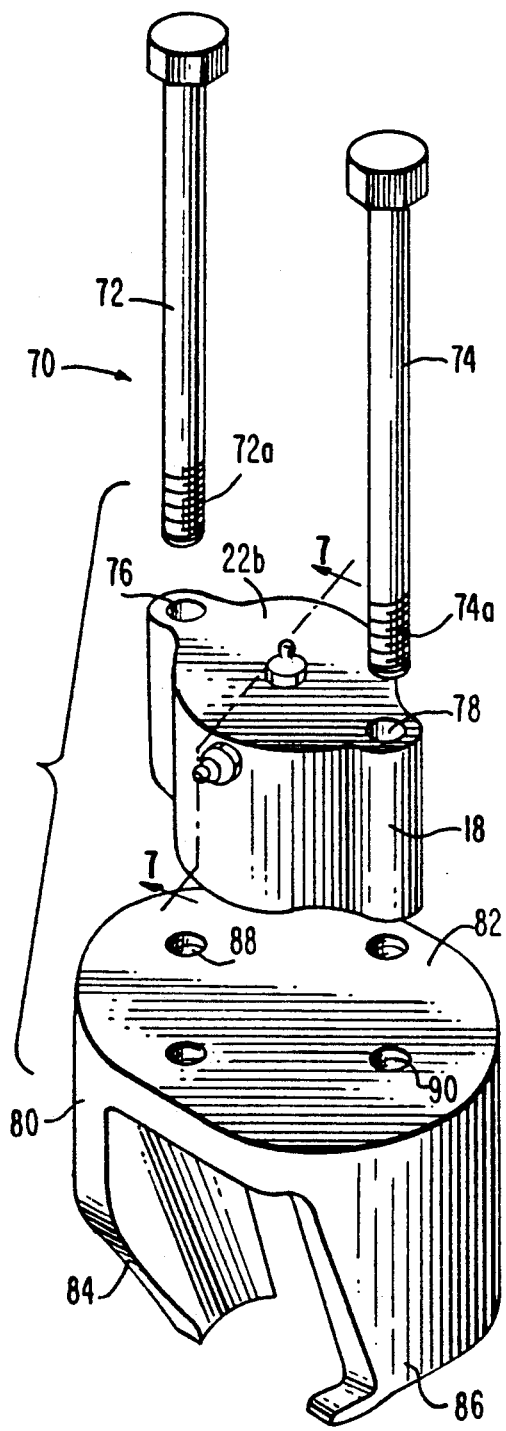
FIG. 6 is a perspective view of a second embodiment of the invention, comprising a push-type tool.

FIG. 6 is a perspective view of the second embodiment of the present invention, and specifically a perspective view of a push-type tool for disassembling the universal joint of the drive shaft of a vehicle. As seen in FIG. 6, the push-type tool 70 comprises a cylinder 18 and associated piston (not shown in FIG. 6, but shown by reference numeral 20 in FIG. 7), a pair of cap screws 72 and 74, and a pushing assembly 80 having a flat surface 82 and pushing or contact fingers 84 and 86 extending downward from the flat surface 82. As was the case in the previous figures, the wall of cylinder 18 is provided with boreholes 76 and 78, through which cap screws 72 and 74 are inserted. In addition, further holes 88 and 90 are provided in the flat surface 82 of pushing assembly 80 to accommodate the portions of cap screws 72 and 74 protruding from the cylinder 18. Furthermore, cap screws 72 and 74 are provided, at their distal ends, with threaded portions 72a and 74a, such threaded portions being provided so that cap screws 72 and 74 are able to be screwed into corresponding threaded holes provided in the upper yoke collar (such as upper yoke collar 42 of universal joint 40 in FIG. 3), so as to fasten the entire assembly, comprising cylinder 18 and pushing assembly 80, to the universal joint.

Figure 7:
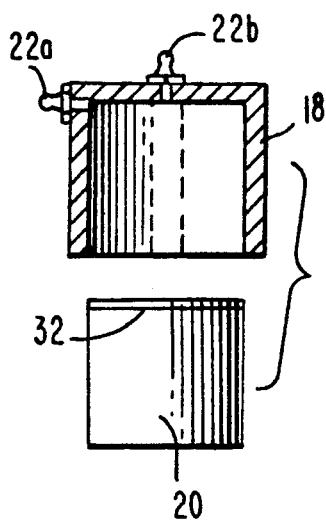
FIG. 7 is a cross-sectional view of the cylinder, as seen along section line B—B' in FIG. 6.

FIG. 7 is a cross-sectional view of the cylinder 18, as taken along section line B—B' of FIG. 6. Again, as was the case previously, cylinder 18 is equipped with filler plugs 22a and 22b, and the interior bore of cylinder 18 is designed to accommodate piston 20. Element 32 is an O-ring grease seal which stays on the piston 20.

In preparation for the disassembly operation using push-type tool 70, the cylinder 18 and piston 20 are mounted on the flat surface 82 of pushing assembly 80, using cap screws 72 and 74 inserted through holes 76 and 78, respectively, in the cylinder 18, and through holes 88 and 90, respectively, in the pushing assembly 80. The entire assembly is then placed over that yoke collar of the universal joint opposite to the yoke collar which contains the first journal bearing to be removed. That is to say, referring back to the universal joint 40 shown in FIG. 3, the push-type tool 70 would be placed over upper yoke collar 42 so that the fingers 84 and 86 would contact the universal joint 40 at points 84a and 86a, respectively, in FIG. 3 (that is, at its cross). In addition, the piston 20 would be in cylinder 18 which is indirectly connected to upper yoke collar 42 via screws 72 and 74.

In operation, the nozzle of a conventional grease gun is inserted onto filler plug 22a or pressure is applied to the interior of cylinder 18, forcing piston 20 downward so as to push downward at points 84a and 86a with the consequent transfer of this pushing force across the universal joint to the opposite side, to lower yoke collar 44 in, such that the journal bearing contained in lower yoke collar 44 is pushed out of the opposite side of universal joint 40. The push-type tool 70 is then removed from contact with the universal joint 40, and the journal end of the universal joint cross is exposed.

Either filler plug 22a and 22b is removed from the cylinder 18, the cylinder 18 is emptied by pushing the piston back into its bore, and then the filler plug 22a or 22b is reinstalled in cylinder 18.

As a second step, the journal bearing contained in upper yoke collar 42 of universal joint 40 (FIG. 3) can be removed by reassembling the push-type tool 70, and fastening it to the lower yoke collar 44 using a cap screws 72 and 74 as previously described. Grease pressure is then applied to the interior of cylinder 18 through filler plug 22a or 22b, and the journal bearing in upper yoke collar 42 will be pushed out. The universal joint cross can now be removed from the universal joint 40.

For a drive shaft disconnect, this is all that would have to be done, as would be well appreciated by hose of skill in the art. However, as will be equally appreciated, for a total universal joint disassembly, steps one and two outlined above would be repeated for the left and right yoke collars of the horizontal yoke of universal joint 40 as seen in FIG. 3.

It will be further recognized by those of skill in the art that, in accordance with the operation of the push-type tool as just described above, if it is considered preferable, the first step could be repeated four times, once for each yoke collar of each yoke member of the universal joint.

While preferred forms and arrangements have been shown in illustrating the invention, it is to be clearly understood that various changes in detail and arrangement may be made without departing from the spirit and scope of this disclosure.

What is claimed is:

1. A tool for disassembly of a universal joint, said universal joint comprising first and second yoke members, said first yoke member having a journal bearing mounted in a given end portion thereof, said tool comprising:

pulling means connectable to said second yoke member for exerting a pulling force on said second yoke member during disassembly;

standoff means connectable to said given end portion of said first yoke member for exerting a pushing force, opposite to said pulling force, on said given end portion of said first yoke member during disassembly; and operating means interposed between said pulling means and said standoff means for operating on said pulling means to cause said pulling means to exert said pulling force on said second yoke member, and for operating on said standoff means to cause said standoff means to exert said pushing force on said given end portion of said first yoke member, thereby forcing said journal bearing mounted in said given end portion of said first yoke member out of said given end portion of said first yoke member;

wherein said operating means comprises a cylinder connected to said standoff means and a piston operating on said pulling means, said piston being movable within said cylinder in a direction away from the universal joint in response to the injection of fluid under high pressure into said cylinder so as to urge said pulling means in a direction away from said universal joint; and wherein said cylinder is in the form of a cylindrical shell formed around a central axis of said cylinder, said cylindrical shell having built-up portions running parallel to the central axis, and wherein at least two boreholes are provided along a length of said cylinder within said built-up portions of said cylindrical shell, said standoff means comprising at least two standoff studs, each being insertable into a respective one of said at least two boreholes.

2. A tool for disassembly of a universal joint, said universal joint comprising first and second yoke members, said first yoke member having a journal bearing mounted in a given end portion thereof, said tool comprising:

pulling means connectable to said second yoke member for exerting a pulling force on said second yoke member during disassembly;

standoff means connectable to said given end portion of said first yoke member for exerting a pushing force, opposite to said pulling force, on said given end portion of said first yoke member during disassembly; and operating means interposed between said pulling means and said standoff means for operating on said pulling means to cause said pulling means to exert said pulling force on said second yoke member, and for operating on said standoff means to cause said standoff means to exert said pushing force on said given end portion of said first yoke member, thereby forcing said journal bearing mounted in said given end portion of said first yoke member out of said given end portion of said first yoke member;

wherein said operating means comprises a cylinder directly connected to said standoff means and a piston operating on said pulling means, said piston being movable within said cylinder in a direction away from said universal joint in response to the injection of fluid under high pressure into said cylinder so as to urge said pulling means in a direction away from said universal joint; and wherein said pulling means comprises a headplate positioned against said piston, and a pair of sidebars, a given end of each of said sidebars being connected to said headplate, and a distal end of each of said sidebars being connected to a respective end portion of said second yoke member; and wherein said sidebars are provided with grooves generally perpendicular to a length of said sidebars and located at said given end thereof, said headplate having a thickness measured in a direction corresponding to the direction of movement of said piston, said grooves being dimensioned to receive the thickness of said headplate so that respective sides of said headplate fit into the groove in respective ones of said sidebars and are thereby connected to said respective ones of said sidebars.

3. The tool of claim 2, wherein each of said sidebars comprises a portion disposed above and substantially parallel to a respective one of said grooves and extending toward said headplate, each of said sidebars further comprising a downwardly protruding portion extending downward from a distal end of said portion, and wherein said headplate has a top surface which is discontinuous on each of said respective sides so as to form respective slots for receiving respective said downwardly protruding portions of said sidebars.

* * * * *